(No Model.) 3 Sheets—Sheet 1.
J. AITCHISON.
APPARATUS FOR ATTACHING OPTICAL INSTRUMENTS TO HEADS.
No. 553,146. Patented Jan. 14, 1896.
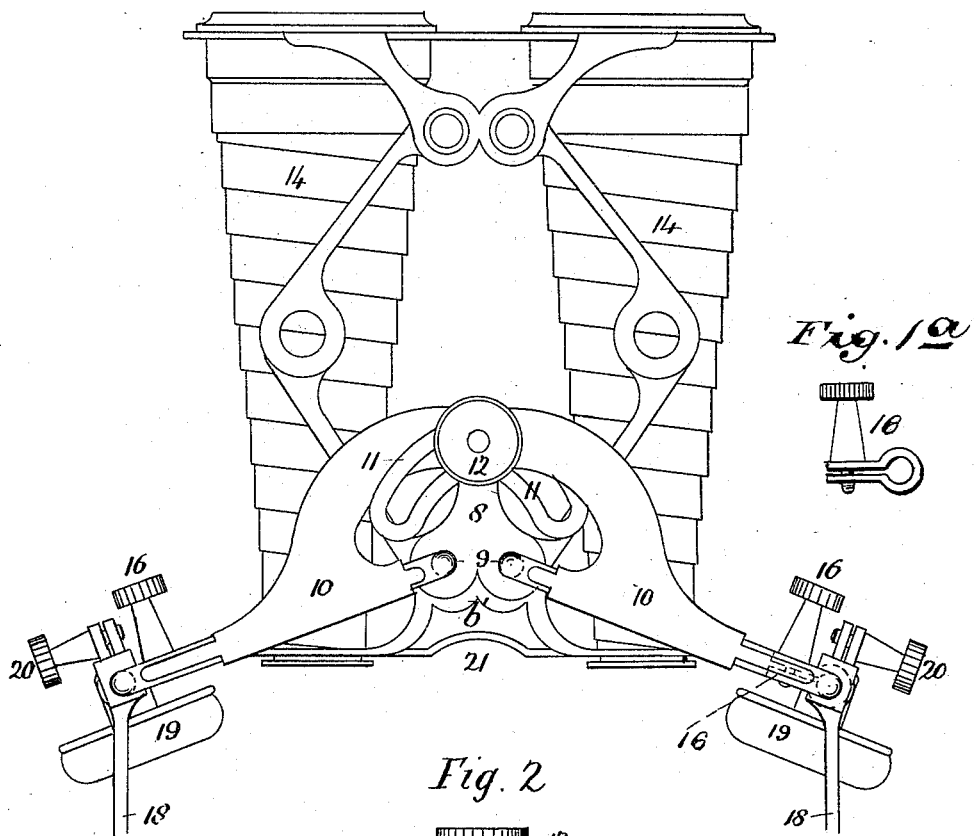
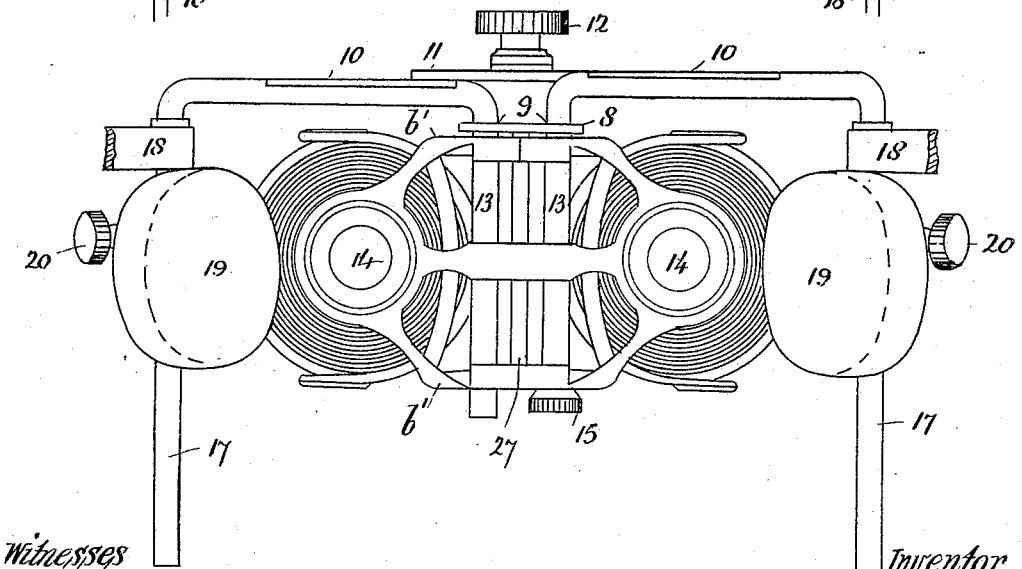
Witnesses
Inventor
James Aitchison
By James L. Norris
Atty.

(No Model.) 3 Sheets—Sheet 2.

J. AITCHISON.
APPARATUS FOR ATTACHING OPTICAL INSTRUMENTS TO HEADS.

No. 553,146. Patented Jan. 14, 1896.

Witnesses.
Dennis Sumby,
Robert Everett

Inventor.
James Aitchison,
By James L. Norris
Atty.

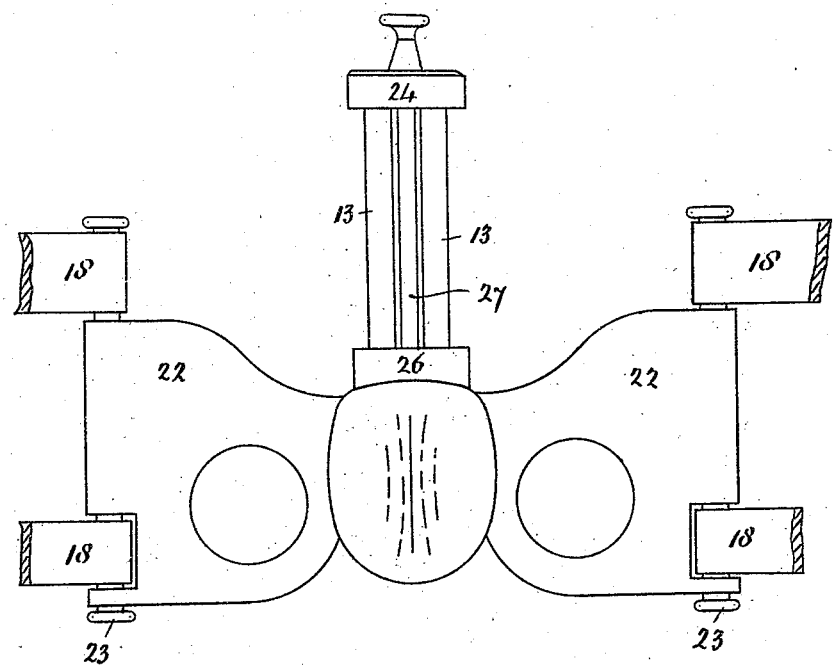
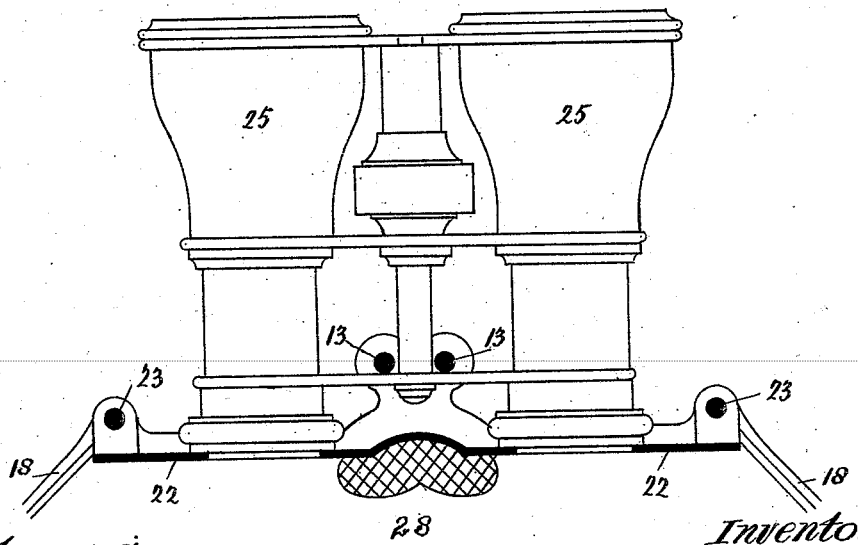

UNITED STATES PATENT OFFICE.

JAMES AITCHISON, OF LONDON, ENGLAND.

APPARATUS FOR ATTACHING OPTICAL INSTRUMENTS TO HEADS.

SPECIFICATION forming part of Letters Patent No. 553,146, dated January 14, 1896.

Application filed December 28, 1894. Serial No. 533,180. (No model.) Patented in England June 23, 1894, No. 12,213.

*To all whom it may concern:*

Be it known that I, JAMES AITCHISON, oculist and optician, a subject of the Queen of Great Britain, residing at 47 Fleet Street and 6 Poultry, London, E. C., England, have invented a new and useful Apparatus for Attaching Optical Instruments to the Head, (for which I have obtained a patent in Great Britain, No. 12,213, dated June 23, 1894,) of which the following is a specification.

The object of my invention is to manufacture appliances for supporting optical instruments and holding the same in position for observation without requiring the aid of the hands in so doing. In addition to and in combination with the said appliances I provide head-bands surrounding or partly surrounding the upper part of the head, the lengths of the bands being adjustable by means of buckles, elastic bands, springs, or analogous appliances to suit the size of the head. The bands are also varied in order to adapt them to the particular kind of instrument required to be supported.

The construction of the intermediate and auxiliary appliances and the methods of attaching the instrument to the band or bands and the bands to the head depend upon the nature of the instrument and the amount of leverage to be counteracted in order to secure and retain the line of vision and other requirements in connection with the use of various optical instruments.

I sometimes attach the head-band to a cap or other head-gear, so that both the band or its equivalent and the aforesaid auxiliary or other appliances or supports may be worn with the cap or other head-gear.

In order that my said invention may be particularly described and ascertained, reference is hereby made to the accompanying drawings, in which similar letters and figures of reference indicate corresponding parts.

Figure 3:
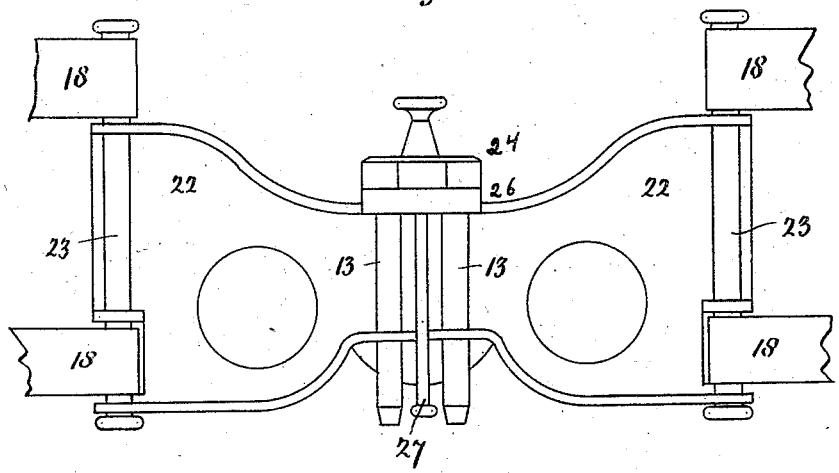
Figure 4:
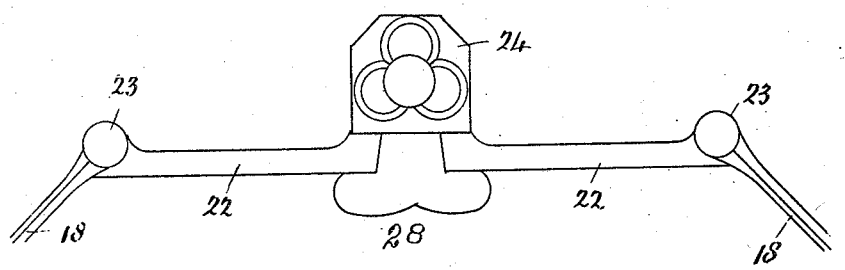

Figure 1 is a plan view illustrating one form of my improved device with a pair of opera-glasses supported in position. Fig. 1ª is a detail view of one of the screw-clamps for supporting the head-bands on their rods. Fig. 2 is a rear elevation of the same. Fig. 3 is a front view of another form of sustaining appliance. Fig. 4 is a plan view of Fig. 3. Fig. 5 is a rear elevation of Fig. 3. Fig. 6 is a horizontal section of the appliance shown in Fig. 3, adapted to an opera-glass of the usual construction.

Referring to Figs. 1 and 2, 8 is a horizontal plate to which two arms 10 10 are pivoted at 9. The pivots are formed by passing the rods 13 downward, as shown in Fig. 2, through the plate 8. The plates 10 10 are curved, as shown in Fig. 1, the ends being slotted at 11. By means of these slotted ends and a clamping-screw 12 the arms 10 10 can be adjusted to any required angle to suit the face. The numeral 14 indicates a pair of opera-glasses having an extensible frame carrying at the rear end two rigid and parallel plates *b'*, which are provided with suitable perforations for the passage and reception of the rods 13. The glasses are fixed in position by passing the two rods 13 through the perforations in the two plates *b'*, and further secured by means of the screw 15 fitted to one of the rods 13. The numerals 18 18 indicate the head-bands. These head-bands are looped to the rods 17, as shown, and are clamped thereon by screw-clamps 16 16, attached to the rods 17 17, and the clamps 16 are placed on the rods 17 immediately beneath the loops of the straps 18 and prevent the straps slipping downward. The head-bands are made of sufficient length to surround the upper part of the head, buckles, springs, clasps, or other adjustable appliances being added thereto. 19 19 are two cushions attached to the rods 17 by adjusting-clamps 20 20. These cushions or pads are adjusted both angularly and vertically by means of the clamps 20, so as to rest against the face of the wearer at or near the cheek-bones and form fulcrums to counteract the leverage of the opera-glasses when extended. In addition to these face cushions or pads I fit a nose-pad at 21, as hereinafter described.

Referring to Figs. 3, 4, 5, and 6, a more simple form of my invention is shown. 22 is a flat plate, the upper and lower edges being flanged for the purpose of stiffening the plate and forming lugs to receive the rods 23, as shown. 24 is a block to which the sliding rods 13 13 are attached. These rods slide in the block 26 attached to the plate 22. In Fig. 5 they are shown raised ready to receive the glass. In Fig. 3 they are shown lowered to the position assumed when the glass is fixed thereto, as shown in Fig. 6. The third rod 27, attached to the plate 8 in Figs. 1 and 2 and to the block 24 in Figs. 3, 4, and 5, is fitted with a screw-head to prevent the accidental withdrawal of the rods. This rod 27 is omitted in Fig. 6 and its function may be supplied by a chain or equivalent device. The construction shown in Fig. 6 may be used with my improved glass, as shown in Figs. 1 and 2, or with an ordinary glass 25, as shown in Fig. 6. In this form of the appliance I use four straps instead of two, the straps being looped together at each side of the head by means of buckles or otherwise to hold the glass steadily in the absence of face-pads.

The nose-pad 28 renders the appliance firm and steady while being worn and prevents the glass falling out of the line of vision.

The metallic portions of my invention are preferably formed of aluminium to secure lightness.

I claim—

1. A device for attaching opera glasses to the head, comprising a frame provided with means for detachably connecting the opera glasses thereto, a nose pad for supporting said frame over the bridge of the nose, and straps connected to said frame and adapted to be secured about the head for attaching the frame thereto, substantially as described.

2. A device for attaching opera glasses to the head, comprising a two-part frame adjustably hinged together and provided with means for holding opera glasses, a nose pad forming a fulcrum and support for said frame, adjustable pads carried by said frame and adapted to rest against the face, and straps connected to said frame, and adapted to pass about the head and hold the frame in position, substantially as described.

Dated this 31st day of October, 1894.

JAMES AITCHISON.

Witnesses:
GEORGE C. DOWNING,
T. F. BARNES.